United States Patent
Burton

(10) Patent No.: US 6,782,321 B1
(45) Date of Patent: Aug. 24, 2004

(54) METHOD FOR PERFORMING ENVIRONMENTAL SITE CHARACTERIZATION

(76) Inventor: Jacqueline C. Burton, 1328 B S. Federal, Chicago, IL (US) 60605

( * ) Notice: Subject to any disclaimer, the term of this patent is extended or adjusted under 35 U.S.C. 154(b) by 0 days.

(21) Appl. No.: 10/226,202

(22) Filed: Aug. 23, 2002

Related U.S. Application Data

(60) Provisional application No. 60/314,363, filed on Aug. 24, 2001.

(51) Int. Cl.$^7$ ................................................. G01V 9/00
(52) U.S. Cl. ................................. 702/5; 702/12; 703/10
(58) Field of Search .......................... 702/2, 5, 12, 13, 702/6; 703/2, 6, 9, 10

(56) References Cited

U.S. PATENT DOCUMENTS

| | | | | |
|---|---|---|---|---|
| 5,385,827 A | * | 1/1995 | Clark | 435/9 |
| 5,729,451 A | * | 3/1998 | Gibbs et al. | 702/12 |
| 5,808,916 A | * | 9/1998 | Orr et al. | 703/6 |
| 5,831,876 A | * | 11/1998 | Orr et al. | 703/6 |
| 5,835,386 A | * | 11/1998 | Orr et al. | 703/2 |
| 5,892,690 A | * | 4/1999 | Boatman et al. | 700/276 |
| 6,246,963 B1 | * | 6/2001 | Cross et al. | 702/14 |
| 6,312,605 B1 | * | 11/2001 | Kerfoot | 210/741 |

OTHER PUBLICATIONS

Innovative Technology Summary Report–Expedited Site Characterization, U.S. Department of Energy DOE/EM–0420, OST Reference #77, Dec. 1998, 21 pages.*

* cited by examiner

*Primary Examiner*—Donald McElheny, Jr.
(74) *Attorney, Agent, or Firm*—McDermott Will & Emery LLP

(57) ABSTRACT

The QuickSite™ method provides a framework for conducting accurate, timely and economical site investigations and characterizations of potentially contaminated regions. QuickSite™ organizes the investigative steps into three phases, each of which has different objectives but which share a similar iterative nature. The first phase, using any existing data if available, determines the geologic and hydrogeologic features of a site which affect contaminant distribution. The second phase, based on the framework of the first phase, determines the extent of contamination within the site under investigation and the third phase predicts the future contaminant distribution within the site and can provide analysis of different remedial or corrective scenarios if appropriate. Throughout the data collecting, analysis and interpretation steps of each phase rigorous quality control and assurance practices are implemented.

9 Claims, 2 Drawing Sheets

METHOD FOR PERFORMING ENVIRONMENTAL SITE CHARACTERIZATION

RELATED APPLICATIONS

This application relates to and claims priority from U.S. application Ser. No. 60/314,363 filed Aug. 24, 2001 entitled QUICKSITE METHOD, the disclosure of which is hereby incorporated in its entirety by reference.

FIELD OF THE INVENTION

The present invention relates to environmental site characterization and, more particularly, to time and cost efficient characterization of a site.

BACKGROUND OF THE INVENTION

The production, distribution, use, misuse, disposal, or accidental spills of many chemicals have polluted some environments to levels that threaten the health of humans, livestock, wildlife and, indeed, whole ecosystems. Most of these chemicals, or contaminants, are produced to improve human health, standards of living, and safety through advancements in manufacturing, agriculture and agribusiness, medicine, and to strengthen national defense. Ironically, their unplanned intrusions into the environment can have an adverse effect in direct contrast with their intended benefits.

In many countries, such as the United States, efforts to manage and measure the extent and level of the presence of these contaminants in the environment have resulted in many laws and regulations that prescribe, and proscribe, a variety of measures. Environmental site characterizations are usually one of the earliest steps in trying to identify and model pollution and contamination at a potential site. These site characterizations can include many aspects of the environments such as soil, air and water.

Environmental site characterization is the complete definition of all factors that control migration, either past, present or future, of contaminants within a set three-dimensional geographic framework. Complete characterization requires not only definition of such factors but also accurate and quantifiable prediction of the fate of all contaminants in the particular setting.

Historically, site characterization programs addresses contaminant distribution and migration through statistical approaches. These approaches, however, are only useful and valid at sites with homogeneous or uniform subsurface characteristics—something almost never found in the real world. As a result of poor characterizations, poor or incorrect remediation decisions are made.

The label "QuickSite" has been associated with environmental site characterization for at least a few years. However, within this patent application, the term QuickSite™ is used to refer to a novel and complete implementation and methodology for site characterization. This novel QuickSite™ methodology is based on research begun at Argonne in the early 1990s and was, at least partly, developed out of the Argonne Expedited Site Characterization (ESC) approach which is the basis for the American Society of Testing and Materials (ASTM) Standard Practice D6235-98 for expedited site characterization. Although ASTM D6235-98 gives general guidance and a philosophy for the Argonne ESC, there remains the need for a system and method that realistically and specifically implements the methodology and protocols developed for the Argonne ESC. Furthermore, previously published research related to the Argonne ESC efforts merely contain general descriptions and discussions about the process, its benefits, applications, successes, etc. In contrast, the present description about the QuickSite™ method describes a complete, integrated, ready-to-implement system and methodology for providing cost and time efficient environmental site characterizations.

SUMMARY OF THE INVENTION

The present invention addresses and meets these and other needs by the present QuickSite™ method which provides a framework for conducting accurate, timely and economical site investigations and characterizations of potentially contaminated regions. QuickSite™ organizes the investigative steps into three phases, each of which has different objectives but which share a similar iterative nature. The first phase, using any existing data if available, determines the geologic and hydrogeologic features of a site which affect contaminant distribution. The second (optional) phase, based on the results of the first phase, determines the extent of contamination within the site under investigation and the third phase predicts the future contaminant distribution within the site and can provide analysis of different remedial or corrective scenarios if appropriate. Throughout the data collecting, analysis and interpretation steps of each phase rigorous quality control and assurance practices are implemented. Some benefits include reaching correct answers for determining need for remedial or corrective actions at a site that are (1) fact and cost-effective, (2) acceptable under existing regulatory statues, and (3) not site or contaminant specific.

One aspect of the present invention relates to a method for performing site characterization. According to this method a first geologic/hydrogeologic model for a site is developed and then contaminant samples from the site are acquired based on the first model. As a result, future contamination distribution at the site can be predicted based on the first model and the acquired samples.

Another aspect of the present invention relates to a method for performing site characterizations. According to this method, a preliminary model of subsurface and hydrological features of a site is developed and investigative technologies are then selected based on the preliminary model. Next the site is examined using the selected investigative technologies to modify the preliminary model to conform to the site; and future contamination distribution at the site can be predicted based on the modified preliminary model.

Yet another aspect of the present invention relates to a method for performing environmental site characterizations. According to this method, a geologic/hydrogeologic model for a site is developed and then migration pathways for contaminants are identified based on the model.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accom

DESCRIPTION OF THE PREFERRED EMBODIMENT

Figure 1:
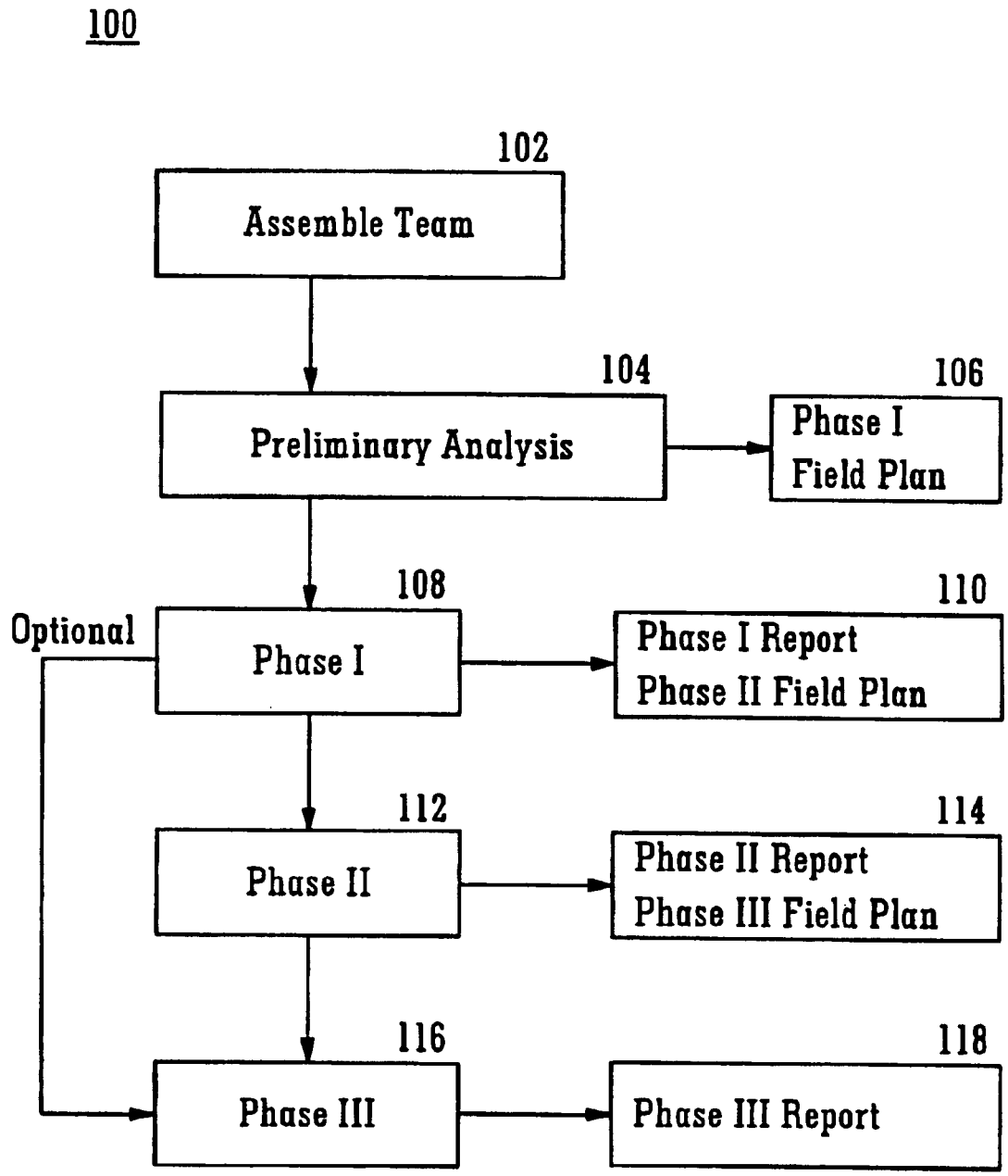
- FIG. 1 illustrates a high-level flowchart according to an exemplary embodiment of the QuickSite™ method.

To aid with the explanation of the present invention, concrete examples have been given of hydrologic sensing techniques, quality assurance procedures, and data sampling, collection and analytical techniques. The present invention is not limited to these and other specific cases provided herein which, instead, are give only by way of example to aid in the understanding of the present invention.

QuickSite Overview

The present QuickSite™ method can be used for application to a wide variety of environmental problems. For example, it can be used for investigating past practices at a site (e.g., CERCLA), present practices at a site (e.g., RCRA and DOD base closure actions) and future practices (e.g., pollution prevention, safe drinking water investigations, and land development)

The QuickSite™ methodology is modular in design and consists of a dynamic, iterative process that is followed throughout the different phases of investigation described herein. The iterative process and all three phases may be used in their entirety for complex sites, or the iterative process within a given phase may be used without a field program for such projects as real estate assessments or land use planning. The QuickSite™ method may rely on a wide range of technologies, some well-known and others cutting edge. The QuickSite™ system is a combination of methods, protocols, and procedures designed for rapid and accurate data analysis of site features that control environmental distribution of contaminants.

One feature of the QuickSite™ process is a comprehensive quality control methodology for every aspect of the investigation, for example, from interview data all the way to geological logging. This aspect itself clearly distinguishes QuickSite™ apart from historical site characterization methodologies in which quality control was limited in application only to quantification of chemical concentration data.

QuickSite™ relies on the assumption that the major control on the distribution and migration of contaminants at any location will be geologic/hydrogeologic heterogeneity. Geologic/hydrogeologic heterogeneity refers to the situation where the subsurface in nearly all locations is not uniform but composed of different and varying types of rocks and soils. The chemical and physical differences in these rocks and soils affect the way water and contaminants can move in the subsurface. By first understanding how this heterogeneity controls migration of fluids in the subsurface, the QuickSite™ methodology quickly focuses on the migration pathways for contaminants and limits sampling to those identified pathways. By focusing sampling in this manner, extensive cost savings results and an accurate depiction of contaminant distribution is developed that permits assessing current and future risks.

One of the first tasks according to the QuickSite™ program is identifying and addressing the inherent subsurface heterogeneity through a nonstatistical, multidisciplinary technical approach. By using multiple techniques and methods to identify migration pathways in the early stages of a site investigation, the present method permits the design of a concise, cost-effective program for contaminant delineation in the subsurface.

The QuickSite™ method does not necessarily dictate the same set of data collection techniques or modalities for every site; but, rather, provides a framework in which different phases, and their objectives, can be carried about by trained and skilled personnel in a variety of ways and combination depending on the quality of the existing data, site-specific characteristics, and the complexity of the problems at hand.

QuickSite's Three Phases

FIG. 1 depicts a flowchart 100 of a preferred embodiment of the present invention in which investigations performed according to the QuickSite™ method are composed of three phases. Although not shown in the high-level schematic view of FIG. 1, an iterative process of data gathering and screening is employed throughout each of these phases. Instead, FIG. 1 provides a high-level overview of the organization of the QuickSite™ method and detailed explanation of each step is provided below in relation to FIG. 2.

Although the types of data and data gathering may differ drastically between phases, the iterative process remains the same—evaluation, qualification, assimilation, integration, and interpretation of all quality data, coupled with program modification to retrieve that data necessary to prove or disprove a working hypothesis for the site. What results is a dynamic process that can change as the site and circumstances dictate.

A QuickSite™ investigation is performed by a multidisciplinary team 102 of trained and experienced scientists who are assembled in anticipation of the problems and objectives of a particular site. As a result of the multiple-disciplines available to formulate hypotheses, plan strategies, collect data and analyze and interpret results, the QuickSite™ method results in more reliable conclusion than historical site characterization methods.

As a preliminary step 104, a QuickSite™ investigation begins by ascertaining the state of existing data about a site (and the problems to be solved at that site). The state of the data includes locating as much local data as possible and assessing its reliability. If sufficient, high-quality data exists to solve the problem, then the QuickSite™ investigation can end. However, typically the existing data is not suitable for solving the problem and the QuickSite™ process can proceed into the three investigative phases. If formal products from each phase are being produced, the preliminary analysis results in a Phase I Field Plan being published 106 and distributed to the team. The Field Plan can include a preliminary hydrogeologic/geologic model for the site under investigation.

In Phase I 108, investigations are designed to delineate the geologic/hydrogeologic framework of a site and, hence, the features that control or will control contaminant distribution and migration at a site. To start with, the preliminary geologic/hydrogeologic model from step 106 is used as a basis for selecting appropriate scientific disciplines and technologies for the phase I investigation. The result of this phase is the development of a three-dimensional site model 110 that completely defines surface and subsurface features that will either inhibit or promote movement of contaminants at the site. An accurate definition of these features is deduced by proving the existence of each feature via multiple, different techniques and disciplines with a focus on maximizing quality and minimizing quantity of data collection. By identifying the controlling features prior to extensive sampling at a site, significant cost savings are realized as the QuickSite™ investigation proceeds. If the purpose of the QuickSite™ investigation is prediction of the way future introduction of contaminants into a setting will affect the site, the investigation can either omit Phase II 112 altogether and skip to Phase III 116 or combine select portions of Phase II in with Phase III.

Phase II investigations 112 are used when the problem at hand involves past or ongoing introduction of contamination at a site. The Phase II investigation are more limited in scope, time and cost than Phase I investigation and have the purpose of developing an accurate picture of contamination both in the subsurface vadose zone (i.e., above groundwater or soil) and in the groundwater or saturated zone. In particular, data from the Phase I investigation on migration pathways are used to minimize the number of samples required to completely define contaminant distributions in both of these subsurface zones. As a result of Phase II, a report 114 can be generated that delineates the concentration of contamination within the site.

If required, additional data on aquifer characteristics can be collected in Phase II. For example, if the contaminant concentration data in Phase II indicate that long-term prediction of plume movement in groundwater will be required, points for measuring water levels, permeability, etc. may be installed. Subsequently, these activities may be added to Phase III for sites involving prediction of the effect of future activities on a given locality.

Phase III investigations 116 are used to develop long-term predictions of the fate of contaminants in a given setting. In terms of cost and time, this phase of the QuickSite™ method is generally least costly and time consuming. Two unique features related to this phase of QuickSite™ involve the use of a "calibrated" model for detailing groundwater plume behavior over time and a dynamic risk analysis for determining if and what type of remedial or preventive actions are required for the site. Calibrated models are models that are constrained by, and therefore are true to, all verifiable site data that has been collected. Only after the generation of a calibrated model can a hydrogeologist proceed to make predictions 118 of future plume migration and contaminant fate. Dynamic risk assessment refers to the use of calibrated plume predictions to determine actual contaminant exposure values at designated locations in a plume's pathway. Instead of assuming constant contamination levels over time, this accurate prediction regarding plume behavior leads to development of risk assessments that dynamically consider time-based changes to future contaminant levels and locations. As a result, these dynamic risk assessments can more correctly provide guidance regarding remediation scenarios.

QuickSite in Detail

Figure 2:
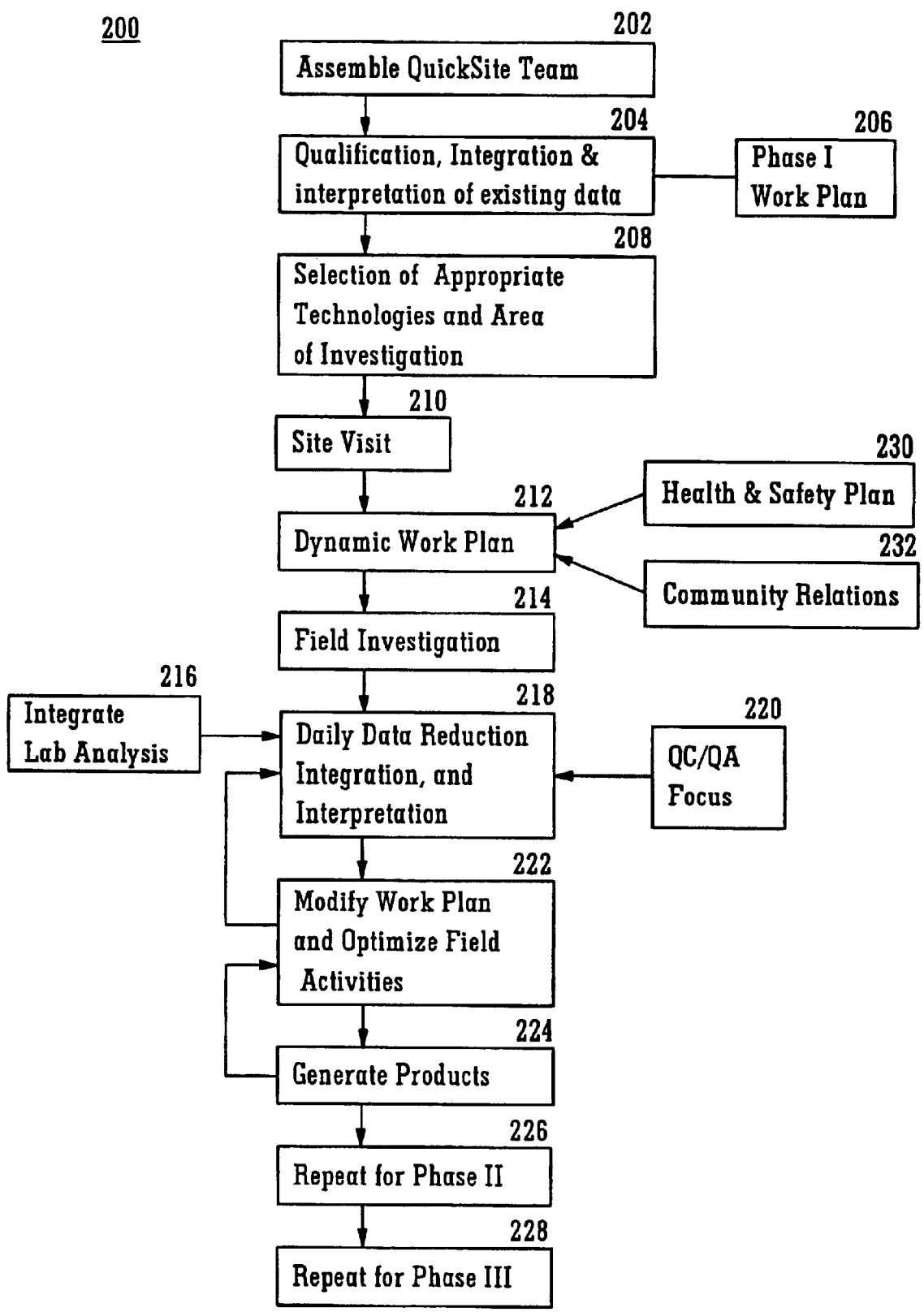
FIG. 2 illustrates a more detailed flowchart according to the exemplary embodiment of FIG. 1.

FIG. 2 depicts a more detailed view 200 of the QuickSite™ method and its individual phases. The major difference between phases is the goal of each phases and, therefore, the types of data being collected, the type and number of staff participating, and the length and breadth of the field program. A Phase I investigation encompasses a much broader field program in terms of technologies than does a Phase II investigation. However, a Phase II investigation also incorporates the same dynamism of the Phase I investigation to ensure (1) that only necessary data are collected for problem solving and (2) that subsequent cost and time savings are realized. Phase III investigations may have no field activities, but the approach is also iterative and dynamic in addressing and considering all relevant, quality data for predicting long-term behavior of a contaminant.

A team of scientists with diverse expertise and strong field experience that is composed 202 of, for example, geologists, geochemists, geophysicists, hydrogeologists, chemists, biologists, engineers, computer scientists, health and safety experts, regulatory personnel, and technical support staff. The QuickSite™ method provides a framework in which the knowledge, skill and expertise of this team can accomplish an efficient and meaningful site characterization. One additional constraint on this framework arises from regulatory controls that govern the identification and selection of appropriate remedial actions at hazardous sites as well as the treatment and disposal of wastes derived during an investigation. The QuickSite™ methodology relies on the professional judgment of site investigators in selecting among intrusive and non-intrusive investigative techniques to accomplish the characterization objectives while satisfying all environmental and safety regulations.

The technical team first critically reviews and interprets 204 existing data for the site and contaminants to determine which data sets are technically valid and can be used in initially designing the field program for a site. Analytical data of some type exist for most investigative sites. Data from previous regulatory activities, geologic well logs, borings and test holes, topographic maps, soil maps, satellite images, aerial photographs, government records and databases, public or state water supply monitoring programs, and previous aquifer research are all common sources for information. A general assessment of this data's quality can be determined, for example, by answering the questions—have different laboratories generated the same results, have consistent values been generated for a sample over time, do duplicate samples from a laboratory compare well, has the laboratory included a demonstration of accuracy, and are the analytical results consistent with the features of the site? QuickSite™ also contemplates other, industry-recognized means for performing this important step of assessing data reliability before proceeding.

As indicated, existing data about a site is initially analyzed, these data are studied to identify stratigraphic units and produce geologic cross-sections of the area. From these data an initial, or preliminary, stratigraphic and hydrostratigraphic understanding of the site area can be interpreted.

After the data evaluation, integration and interpretation 204 are complete and the objectives of the QuickSite™ program are established, an appropriate suite of technologies and methodologies is chosen 208 for the activities necessary to address each objective for the particular site. No one technology works well at all sites, and a suite of techniques is needed to fully delineate and verify site features controlling contaminant distribution in a time-effective manner. Also, the use of multiple techniques and methodologies provides greater confidence in decision making that will satisfy objectives correctly. A Phase I workplan 206 can be developed at this stage describing a preliminary geologic/hydrogeologic model for the site and methods for confirming and correcting the preliminary model so that it ultimately conforms more closely to the site's actual surface and subs features and characteristics that affect the migration pathways of contaminants.

A site visit 210 occurs before the field plan, or work plan, is finalized. The site may have physical, logistical, or cultural features that preclude certain technologies or methodologies from being utilized. All of these factors can be taken in account when finalizing the work plan as the site may have characteristics that might prohibit or enhance particular technological approaches.

After the field visit, the team selects a suite of technologies appropriate to the problem and completes the design of a field program. Non-invasive and minimally invasive technologies are emphasized to minimize risk to the environment, the community and the team members. Ultimately a work plan is developed 212 that outlines the activities to be employed in satisfying the programs objectives at a site. This work plan, however, is not static but is dynamic and can change based on such variables as the values of data being collected, or on which techniques are producing results better than other techniques. Within QuickSite™, "dynamic" does not merely mean field testing data sets but entails dynamic collection and analysis across multiple data sets with a focus on quality controlled analysis for the site. In other words, "dynamic" encompasses analysis and integration of data across multiple data-sets such that, for example, results of a bore hole sample may be used when determining where and to what extent aquifer samples are required. Thus, dynamic analysis and integration allows decisions about data to be optimized rapidly according to one or more data sets from almost any source on site.

One part of a QuickSite™ program can include a health and safety plan 230 to provide the team members with information, procedures, regulations and guidelines needed to conduct their work with minimal hazard to their health and safety. The plan can include, for example, information relating to chemicals, noise levels, mechanical hazards, fire, electrical hazards, lightning, protective equipment, etc. Also, during the site visit, potential issues that might affect the community can be identified along with a plan 232 for handling such issues to avoid problems.

Site-specific work plans contain details, depending on which Phase is being performed, about sampling media, modes, intervals, and frequencies for specific sampling events generally used to acquire soil, water, and vegetation samples. Using known techniques, these sample can be collected for chemical and geotechnical analyses. Examples of such techniques include drilling, auguring, ECPT, and sampling existing wells. Additional characterization benefits may also be realized from surface water samples or vegetation samples.

The site plan can also specify commonly recognized analytical methods to utilize in the immediate analysis of sufficient soil and water samples while the team is in the field in order to guide decision making about the location and extent of contamination. Water samples are analyzed, for example, for VOCs including carbon tetrachloride and chloroform. Of course, other contaminants could be investigated as well. In addition, several physical and chemical parameters of groundwater samples are measured to characterize the hydrogeological conditions. Parameters used for hydrogeological characterization include (1) field measured parameters of temperature, pH, and conductivity; (2) concentrations of dissolved cations and anions, and (3) ratios of stable oxygen and hydrogen isotopes. Results of chemical isotope analyses of groundwater samples can be used to distinguish waters from different aquifers or stratigraphic intervals, as well as to trace apparent flow paths in the subsurface. Isotope ratios can be particularly useful for distinguishing waters from predominantly shale or predominantly limestone aquifers. Selected groundwater samples can also be analyzed for tritium isotope compositions.

Drilling for the QuickSite™ program is conducted primarily to collect soil, rock, and groundwater samples, and secondly, if required, to install monitoring wells or piezometers. Exemplary drilling methods include hollow-stem auger, mud rotary, sonic drilling, and dual-or triple-wall percussion. Of course, other methods can be considered if the circumstance warrant. Additionally, any monitoring wells can be established according to accepted industry practice such as that specified in *Handbook of Suggested Practices for the Design and Installation of Ground Water Monitoring Wells* (National Ground Water Association 1989).

Geophysical methods for collecting data help define, within QuickSite™, the site-specific geologic controls on the configuration and movement of contaminants at the site. The same basic methods of investigation (e.g., seismic, electrical, and borehole) are considered at all sites. However, the suite of geophysical surveys selected for each site varies depending on the geologic framework and the data needs. The geophysics team members review available data pertaining to each site to identify the most appropriate geophysical techniques. Typically, well logs are acquired with different downhole geophysical sensors in the early field investigation to correlate important lithologic units with geophysical parameters and select the most promising geophysics methods. Downhole well data can also be used to model the responses of various surface techniques and identify the methods that are most sensitive to the desired geophysical targets.

The hydraulic parameters of an aquifer, aquifer system, or well installation are determined, according to QuickSite™, by using conventional well pumping (pump test or step test) or well response (slug test)techniques. These test are primarily to estimate aquifer transmissivity and storativity; however, under certain conditions, aquifer tests also provide information on the confined, unconfined, or semi-confined nature of the aquifer; vertical and horizontal isotropy within the aquifer; aquifer boundary conditions; and the vertical hydraulic conductivity of confining beds. The procedures used to select and conduct aquifer tests are well established in ASTM standards (e.g., D4043 and D4044). The goal of this part of the investigation is to determine the form, location, and number of aquifer tests to be employed at any site on the basis of unique hydrogeologic characteristics of the site and specific technical objectives of the site investigation. Then the design of the aquifer testing program is carried out after the development of the preliminary understanding of the site geology and hydrogeology, including information on the thickness, lithology, stratification, depth, continuity, and boundary conditions of the aquifer system and the characteristics of groundwater flow.

After the development of the work plan, Phase I investigation 214 can get underway. During the field investigation 214, the QuickSite™ method includes the concept of collecting a minimum number of samples by differing techniques to generate independent data sets leading to a distinct solution to a given problem. Findings by different techniques are crucial to establishing the credibility of the investigative answers. In a preferred embodiment, three independent confirmations of particular data findings are collected. It is worth noting that QuickSite™ encompasses a number of specific technologies and methodologies to accomplish the objectives of each phase but also relies on the skill and expertise of the team members for determining what are appropriate and complimentary data collection methodologies for the site and the objectives.

The Phase I investigation 214 will focus on delineating contaminant migration pathways and migration inhibitors. Therefore, the geologic and hydrogeologic data, coupled with geochemistry, geophysics, and known contaminant presence or history, may be of priority in establishing which potential pathways must be investigated. In other words, the objective of Phase I is the understanding and delineation of geologic/hydrogeologic framework affecting contaminant distribution. More specifically, the different stratigraphic vertical and areal distributions are determined, key hydrostratigraphic units (and hydraulic communication between them) are identified, likely contaminant migration pathways are determined, hydraulic gradients and groundwater flow directions are determined, and these data are then evaluated.

As an example, a possible Phase I scenario might resemble:

Problem: A contaminant was introduced at the surface of a two-aquifer system

Objective: Determine if the aquifers are isolated; because if isolated then only the upper aquifer needs to be studied.

Result: Reduce field time and cost by only studying upper aquifer.

In step 218, the team members reduce, integrate and interpret data that relates to the ongoing field investigation. In a preferred embodiment, this step 218 is performed daily so as to guide the next days efforts. In performing step 218, commercially available computer software can be used to aid in data analysis, data modeling, and data visualization. The team members are responsible for interpreting data but computers and software can be used to aid with this interpretation. By using these tools, visualization of large amounts of stat (e.g., logs, soundings) is possible and gaps or inconsistencies in the data can become readily apparent. As a result, the field investigation can be dynamically modified to improve the reliability of subsequent findings and optimize data collection activities.

Also included in the integration and interpretation of data in step 218 is the integration of laboratory analysis 216. In conjunction with the field analysis of data, the team also sends samples to outside labs to perform more sophisticated analysis than possible in the field and to provide confirmation of results. The guiding principle for the team members in performing step 218 is two fold: (1) qualify the accuracy and effectiveness of the data and (2) qualify the appropriateness and effectiveness of the techniques being used to gather data. Based on these determinations, the team members can suggest modifications to optimize the work plan, for example, by adding or deleting appropriate technologies or techniques.

Another part of the QuickSite™ program can include application of a stringent set of quality assurance and quality control mechanisms at each stage of the site investigation according to a plan 220. The QuickSite™ process relies on the interaction of a number of different disciplines to characterize a contaminated site completely and accurately. Hence, all of the geologic, hydrogeologic, geochemical, and geophysical data available in the field are acquired, interpreted, and integrated on the site. Discrepancies between geophysical results, well logs, pump tests, analytical results, or electronic cone penetrometer (ECPT) soundings must be resolved in the field to ensure maximum confidence in the final results.

The technical team at the site critically reviews and assigns a quality designation to all data available for a site and a particular QuickSite™ phase of investigation. This process of establishing data quality is performed on all data sets, including geologic data, hydrogeologic data, field testing data, analytical data, etc. When the data are properly qualified, judgments as to the extent of data gaps and the reliability of initial hypotheses can be generated. In addition, when higher-quality data are obtained that may refute data of lower or uncertain quality, it is readily apparent which data set is to be honored on subsequent interpretations. After the data are critically reviewed and assigned a quality value, all data sets retained for the site are integrated and interpreted according to the goals of that particular QuickSite™ investigative phase.

Quality in sampling and analysis is assured through documentation of activities, performance audits, system audits, and periodic evaluations of QC procedures. The investigations QA/QC requirements can be satisfied through periodic and final reviews covering all aspects of sampling, field measurements, chemical analyses, data collection, data reporting, periodic instrument calibrations, routine maintenance of analytical equipment, calibration of analytical instruments, and standardization procedures in analyses. Additionally, technical review of the results ensures that the stated objectives of an investigation are met. The expertise of team members is relied upon in perform QA/QC procedures which can include such activities as proper sample collection, calibrating field instruments, using field blanks, using field rinsates, using field replicates and trip blanks during transport, collecting laboratory duplicates, proper handling and preservation of volatile organic compound samples, and maintaining proper QA/QC records. Additionally, quality assurance and control is followed for activities such as the geologic (or stratigraphic) investigation, hydrogeology investigation, geophysics investigation, spatial control procedures and maintenance of computer records. One additional benefit resulting from the QA/QC measures is that faulty field tools (e.g., ECPT) can be identified (and addressed) almost as soon as a failure or out-of-calibration condition occurs.

Another distinguishing feature of the QuickSite™ method that permeates all phases of an investigation is that of information management. The work plan for an investigation includes the requirements for how data and information relating to that data will be managed. This information plan considers a number of factors when determining the identification, labeling and storage of data and information. For example, some considerations include the need for data to be easily identifiable and retrievable, interrelated or derivative data to be easily correlated and retrieved, data to be reviewed and tracked in order to aid in the QA/QC process, and data and findings to be reported to and/or audited by other parties or after passage of a long period of time. The QuickSite™ method contemplates including information management techniques and mechanisms to satisfy these objectives.

As alluded to before, the purpose of the daily data integration and interpretation is to determine if the work plan and field investigations need to be modified 222. Once a geologic or stratigraphic feature has been reliably established, there is no need to continue data collection in support of that goal. Similarly, data interpretation may reveal that an early assumption or conclusion was incorrect and needs to be modified along with the suite of technologies originally suggested. The QuickSite™ method readily supports modifying the dynamic workplan 222 through its continual collection, review, integration and interpretation of data along multiple disciplines.

Once all the objectives of a phase have been accomplished, then certain work products can be generated 224. For example, after Phase I, a plan for sampling and investigating the particular site's geologic and hydrogeologic structure can be developed based on a 2-D or 3-D visualization of the site. After Phase II, for example, a set of parameters and values can be established for inclusion in a groundwater model; while after Phase III, a risk assessment or possible a remediation analysis can be reported. As shown in the flowchart 200, the generation of a product 224 can, itself, result in a modification of the work plan 222 used in subsequent phases.

The flowchart of FIG.2 depicts in more detail the steps within Phase I of the QuickSite™ method while merely including a single box for Phase II and Phase III. These subsequent phases differ from phase I in their objectives and goals; however, they similarly use the multi-disciplinary, iterative steps explained above with relation to Phase I. In each phase, stringent QA/QC methods and dynamic data integration play a pivotal role.

As for the different phase objectives, the geologic and hydrogeologic understanding of the site obtained by achieving the objectives of Phase I provide the framework for designing and guiding Phase II of the investigation which focuses primarily on delineating contaminant concentrations at the site and within hydrostratigraphic units that compose migration pathways. Phase II benefits from Phase I by utilizing geologic/hydrogeologic data to guide and limit contaminant sampling and minimize data collection. Phase II provides to Phase III sufficient data to permit a dynamic assessment of health risks arising from contamination at the site under realistic, site-specific constraints and to predict the long-term fate of contamination and if corrective actions are needed In each phase, regardless of the specific objectives however, the work plan is used to guide field investigations which results in the collection and interpretation of data from many sources. This data is integrated and interpreted daily and used to modify or revise the work plan to ensure that the goals of the investigation are satisfied in a timely and cost-effective manner. Thus, Phase II and Phase III share many, if not all the steps of the flowchart 200, described above with relation of Phase I Within Phase III (and other phases sometimes) the team can utilize software to model groundwater characteristics in order to generate the remediation analysis and risk assessments that result from Phase III. In particular, a number of applications are available that perform groundwater modeling. Groundwater modeling is the mathematical simulation or prediction of groundwater movement or groundwater movement coupled with contaminant transport. In the early stages of QuickSite™, groundwater modeling can be a tool for interpreting and integrating available field data to aid in refining the site's preliminary hydrogeologic model. In later phases, the models can be used to predict alternative groundwater remediation scenarios and provide input for the estimation of health and environmental risks. Modeling packages sometimes differ in capabilities and, to the extent possible, site specific data that are relevant to the physical domain and processes being simulated should be used in constructing the models. These data can include boundary conditions, aquifer characteristics, average rainfall, draining characteristics, water levels, source and sink locations and flow rates, recharge, surface drainage, contaminant properties, and distribution. Where specific data are lacking, the use of parameter values from hydrogeologically similar locations can be used.

In keeping with the focus, within QuickSite™, of reliable and verifiable conclusions, groundwater models are not used in Phase III without first calibrating them. Model calibration is carried out by using an iterative trial-and-adjust procedure. In QuickSite™, preferably, detailed notes are kept for each model calibration step so that a chain of adjustments leading to a final calibrated model can be evaluated and recreated if necessary. Example parameters and approaches that may be used to develop the calibration include matching of simulated and measured hydraulic heads under both steady-state and transient flow conditions; comparison of estimated recharge rates with measured recharge and rainfall data; matching of groundwater flow directions and hydraulic gradients under steady-state and transient conditions; simulation of aquifer pumping test results; matching of documented pumping or natural discharge rates; and simulation of contaminant migration, plume formation, and concentrations.

According to a preferred embodiment of the QuickSite™ method, sensitivity testing of the resulting calibrated model is subsequently carried out by systematically varying each model input parameter over a range of values. A quantitative analysis of the effects of uncertainty of each parameter is included in the description of the calibrated model.

In the end, the model can be used to conservatively simulate possible remedial actions tailored to the specific site and thereby demonstrate the range of clean-up options available. Additionally, modeling of solute transport for the prediction of contaminant levels can include simulation of a possible worst-case scenario and most-probable contamination migration scenarios in order to provide a conservative range of concentration estimates for use in subsequent risk assessment calculations.

Although the present invention has been described and illustrated in detail, it is understood that the same is by way of illustration and example only, and is not to be taken as a limitation, in scope or spirit, of the present invention which is limited only by the terms of the appended claims.

What is claimed is:

1. A non-statistical method for performing site characterization, comprising the steps of:

(a) obtaining a plurality of types of existing environmental data indicative of environmental conditions of a site;

(b) evaluating each type of existing environmental data against predetermined criteria to determine valid types of existing environmental data, the predetermined criteria including at least one of: consistency of the environmental data from a plurality of sources, consistency of the environmental data over a period of time, a historical record of reliability of the source of the environmental data, and consistency with physical features of the site;

(c) assimilating the valid types of existing environmental data to identify heterogeneity of subsurface features within the site;

(d) developing a first model for the site to identify migration pathways for contaminants based on an assumption that migration of contaminants with the site will be geologic and hydrogeologic heterogeneity;

(e) acquiring at least three independent sets of environmental measurements indicative of the contaminants from the identified migration pathways based on the first model;

(f) evaluating the first model based on each of the independent sets of environmental measurements to verify the validity of the first model;

(g) if the first model is not verified to be valid, assimilating the valid types of existing environmental data and the environmental measurements to modify the first model;

(h) repeating steps (e) through (g) until the first model is verified to be valid; and (i) predicting future contamination distribution at the site based on the first model and the acquired environmental measurements.

2. The method according to claim 1, wherein step (e) includes using a different technique for each environmental measurement.

3. The method according to claim 1, further comprising the step of:

analyzing remediation scenarios for the site based on the first model and the predicted future contamination distribution.

4. The method according to claim 1, wherein the step of predicting includes the step of:

modeling groundwater characteristics at the site based on the first model and the acquired environmental measurements.

5. The method according to claim 4, further comprising the step of:

calibrating the modeling of groundwater characteristics based on acquired environmental measurements.

6. The method according to claim 4, further comprising the step of:

determining respective sensitivity to one or more parameters of the modeling of environmental measurements.

7. The method according to claim 1, further comprising the step of: conducting a site visit before acquiring the environmental measurements.

8. The method according to claim 1, further comprising the step of:

applying respective quality control/assurance mechanisms while performing each of the steps of developing, acquiring and predicting.

9. The method according to claim 1, further comprising the step of:

developing a dynamic risk assessment for the site based on the predicted future contamination distribution.

* * * * *

UNITED STATES PATENT AND TRADEMARK OFFICE
CERTIFICATE OF CORRECTION

PATENT NO. : 6,782,321 B1
DATED : August 24, 2004
INVENTOR(S) : Jacqueline C. Burton It is certified that error appears in the above-identified patent and that said Letters Patent is hereby corrected as shown below:

<u>Column 1,</u>
Line 5, insert the following:
-- GOVERNMENT SUPPORT
The United States Government has rights in this invention under Contract No. W-31-109-ENG-38 between the U.S. Department of Energy and the University of Chicago representing Argonne National Laboratory --.

Signed and Sealed this

Tenth Day of May, 2005

JON W. DUDAS
*Director of the United States Patent and Trademark Office*